April 27, 1943.  G. A. LYON  2,317,393
WHEEL STRUCTURE
Filed Sept. 29, 1941
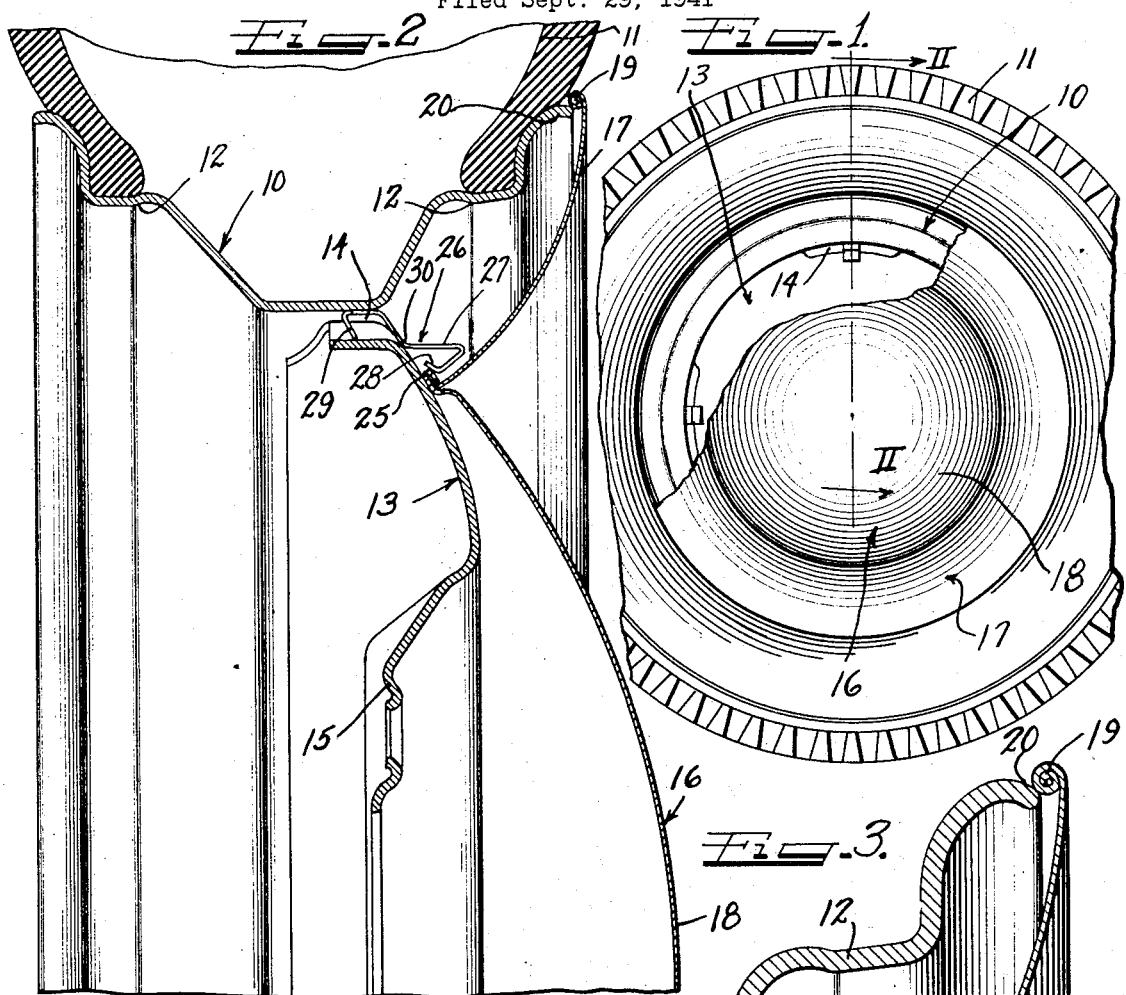
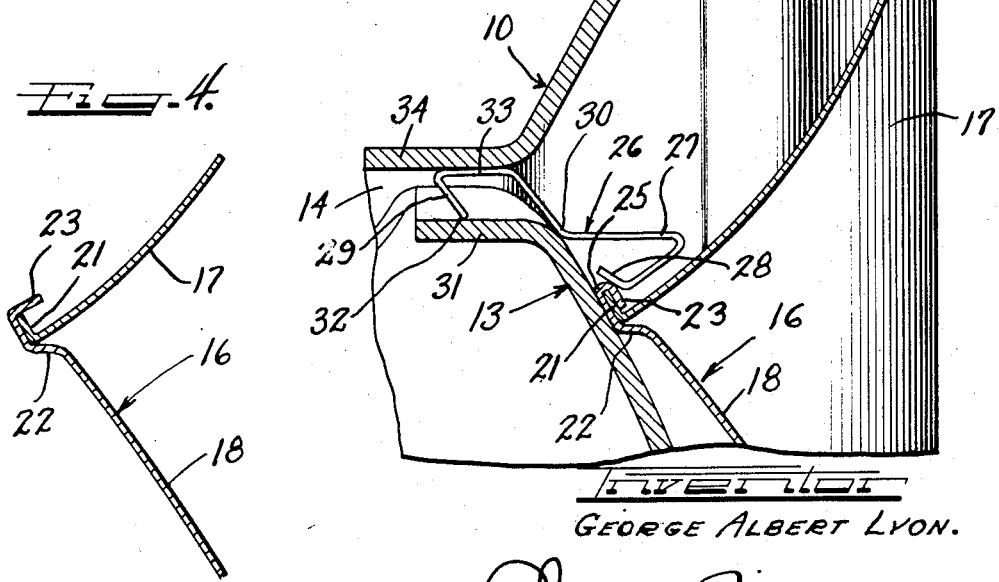
Inventor
GEORGE ALBERT LYON.

Patented Apr. 27, 1943

2,317,393

UNITED STATES PATENT OFFICE 2,317,393

WHEEL STRUCTURE

George Albert Lyon, Allenhurst, N. J.

Application September 29, 1941, Serial No. 412,754

6 Claims. (Cl. 301—37)

This invention relates to a wheel structure, and more particularly to a wheel cover for a wheel and means for detachably retaining the wheel cover on the wheel.

At present, due to the Defense Program, stainless steel is at a premium, and as a consequence manufacturers of stainless steel wheel parts, such as wheel covers, are endeavoring to find substitute materials which will blend in effectively with the remaining structure of the wheel.

To this end, I have evolved a wheel cover which may be made of relatively low carbon steel and which may have an outer ring portion thereof finished in white so as to cause the same to appear as a white side wall portion of the tire on the wheel.

An object of this invention is to provide a simplified wheel cover which will serve the dual purpose of concealing the bolt-on flange of the wheel and also of giving the tire on the wheel the appearance of having a white side wall.

Another object of this invention is to provide a wheel cover comprising a ring and a hub cap with an improved connection between these two parts and which connection can, by reason of its reinforcement, cooperate effectively with spring retaining means on the wheel.

Still another object of this invention is to provide a cover with a simplified and more effective lockseam connection between the cooperating parts of the wheel cover.

Yet a further object of this invention is to provide improved spring retaining means cooperating with the flange of a wheel cover in such a manner that the cover may be easily snapped into retained engagement therewith or can be easily pried free of the spring retaining means.

In accordance with the general features of this invention, there is provided in a wheel structure including a drop center rim carrying a tire and a body part having a bolt-on flange a circular wheel cover member comprising a ring of curved cross section for disposition over an outer side of the rim and a central disk or hub cap for disposition over the wheel body part to conceal the bolt-on flange thereof, the inner edge of the ring being lockseamed to the outer edge of the hub cap to form an inclined flange extending generally radially rearwardly toward the wheel rim and cooperable with spring means on the wheel for the purpose of retaining the cover member on the wheel.

A feature of the invention relates to the provision in the above described structure of a lockseam construction of such character that the inner edge portion of the ring of the cover is tightly locked against a rearwardly offset shoulder on the outer margin of the central hub cap.

Yet another feature of the invention relates to the provision in the above described wheel structure of a ring of such curved convex cross section and which extends radially outwardly over an outer edge of the tire rim up to the side wall of the tire as to cause the ring to have the appearance of being a continuation of the tire especially when the ring is finished in white.

A further feature of the invention relates to the provision of cover retaining spring clips, each of which comprises a flexible outer extremity retainingly cooperable with a rear flange of the cover member and an inner extremity wedged in one of the wheel openings into tight retained cooperation with the wheel; an intermediate portion of the clip having a shoulder to bear against the body part of the wheel for the purpose of limiting the extent to which the inner end of the spring clip can be inserted in the cooperating wheel opening.

A still further feature of the invention relates to the arrangement of the spring clips relative to the cooperating rear flange of the wheel cover, so that the outer extremities of the spring clips, when in retaining cooperation with the rear flange of the cover, force this flange tightly against an outer surface of the wheel body or spider.

Other objects and features of this invention will more fully appear from the following detailed description taken in connection with the accompanying drawing which illustrates a single embodiment thereof, and in which:

Figure 1 is a fragmentary side view of a wheel structure embodying the features of this invention and partly broken away to show the arrangement of the spring retaining clips;

Figure 2 is an enlarged fragmentary cross sectional view taken on the line II—II of Figure 1 looking in the direction indicated by the arrows;

Figure 3 is an enlarged fragmentary cross sectional view corresponding to the upper right hand portion of Figure 2; and Figure 4 is a fragmentary sectional detailed view showing the manner in which the cooperating edges of the ring and hub cap may be conveniently lockseamed together.

As shown on the drawing:

The reference character 10 designates generally a conventional drop center type of tire rim which carries a conventional pneumatic automobile tire 11. The side flanges of the rim 10 have depressions 12 formed therein for receiving and holding in place the conventional beads of the tire 11. Disposed centrally of the tire rim and attached thereto is the usual wheel body or spider 13 which is attached at a plurality of spaced points or sections to the bottom or base flange of the rim 10 leaving openings 14 between the areas of attachment. These openings, as is well known in the art, are provided for the purpose of allowing air to circulate through the wheel and around the brake drum to the rear of the wheel. Also, the wheel body or spider 13 has the usual central wheel bolt-on flange by means of which the wheel is detachably attached to a support on an axle of the vehicle.

In accordance with the general features of this invention, I provide a wheel cover 16 for the outer or exposed side of the wheel which includes two parts, namely, an annulus or ring 17 and a central disk or hub cap 18. These parts may be suitably made from sheet metal and by reason of the construction of the wheel cover member may be made of relatively low carbon steel.

The ring 17, as is clearly shown in Figure 3, is of a convex-concave cross sectional configuration and has a turned or rolled outer edge 19 which is so located as to extend radially beyond the outer edge 20 of the concealed side of the tire rim 10. This arrangement is such that the rolled edge 19 is disposed directly opposite the side wall of the tire adjacent the junction of the side wall with the outer edge 20 of the rim 10. By reason of this arrangement, the trim 17, when it is finished in an eggshell white cover, has the appearance of constituting a portion of the side wall of the tire or, in other words, gives the tire the appearance of having a white side wall portion. It should be noted from Figure 2 that the curvature of the ring 17 is such that it follows generally the curvature of the side wall of the tire so as to appear in effect to be a continuation of the side wall of the tire.

The inner marginal portion of the ring 17, as best shown in Figures 3 and 4, is turned rearwardly and then radially outwardly to form an inclined edge portion 21. The inclination of this edge portion is such that it points toward the rim 10. It should also be noted that this turned edge 21 is disposed in close proximity to the openings 14 in the wheel spider 13.

In order to attach the central disk or hub cap 18 to the ring 17, the outer marginal portion of the disk 18 is offset rearwardly at 22 and has its outer edge 23 bent back over the top of the edge 21 and along the rear surface of the edge 21 at 23 thus lockseaming the two cover parts together.

The offset portion 22 of the disk 18 comprises an annular shoulder on which the turned edge portion of the ring 17 is seated to hold the ring centered relative to the hub cap 18. In fact, the two parts are lockseamed together with the inner edge portion of the ring 17 tightly wedged against the shoulder 22.

In assembling the two parts of the cover member together, as best shown in Figure 4, the ring part 17 is first provided with the turned edge 21, and the hub cap part 18 is provided with a U-shaped annular depression of a size and arrangement so that the turned edge 21 of the ring may be inserted therein. Thereafter the outer extremity or edge 23 of the hub cap part 18 is rolled or bent downwardly over the rear surface of the edge 21 thus lockseaming the two parts together. This arrangement is such that one of the rolling wheels or disks can be brought to bear against the shoulder 22 inside of the part 18 and the other rolling disk may be brought to bear against the edge 23 to bend the same, as shown in Figure 4, downwardly over and around the edge 21. Thus, I have provided a simple way of interlocking the two cooperating edges of the ring and disk parts of the cover together. In addition, this type of interlock not only holds the parts together in properly centered relation but also reinforces the cover at the lockseam to provide an inclined flange 25 cooperable with a plurality of spring retaining clips 26. The inclination and arrangement of the lockseamed flange 25 is such that it extends obliquely toward the rim 10 and is adapted to abut an outer surface of the spider wheel body 13 as best shown in Figure 3.

Each of the spring clips 26 has an outer portion 27 bent back upon itself to form a loop, the extremity of which is bent into an inclined edge portion 28 cooperable with the inclined reinforced flange 25 of the cover member 16. The looped portion 27 of the spring is flexible, and the inclination of the end portion 28 is such that the wheel cover may be easily pressed over the high spot of the spring and into retaining engagement with the inclined edge 28 which forces the inclined reinforced flange 25 tightly against the outer surface of the wheel spider 13. The construction of this freely flexible outer end of the spring is such that the cover member 16 may be easily snapped into retaining cooperation with the spring clip but is more difficult to remove and requires a pry-off force to snap it out of retained engagement with the spring clips.

The other end of each spring clip 26 is inserted into a wheel opening 14 over a flanged portion 31 of the spider defining the opening and has its extremity bent into a radially inwardly extending flange 29. The arrangement of this flange 29 is such that its free extremity has a biting engagement at 32 with the flanged portion 31 of the spider. Moreover, any tendency to dislodge the clip from its cooperation with the two parts of the wheel results in an enhancement of the biting engagement at 32 with the portion 31 of the spider. Moreover, due to the inclined portion 29 of the clip being flexible the flexing of this portion is backed up by the portion 33 of the clip bearing on the base flange 34 of the rim 10.

As noted before, any tendency to pull or dislodge the clip out of the cooperating opening results in the end 32 biting more firmly into the portion 31. In order, however, to hold the clip 6 against being pushed too far into the opening, I provide the intermediate portion of the clip with a shoulder 30 which is adapted to bear against the spider 13 thus limiting the extent to which the clip can be inserted in the cooperating opening 14 of the wheel body.

These spring clips 26 may be made of any suitable material such, for example, as spring steel and by reason of the fact that they are separate from the wheel cover do not require that the cover be made of spring steel or high carbon steel.

In the use of my invention, the spring clips are first positioned in the respective openings 14 of the wheel body, which openings may be four in number or of any desired number. Thereafter the wheel cover 16 is positioned over the outer side of the wheel and is pressed inwardly until the edge of the inclined rearward flange 25 thereof contacts the high points of the free ends of the spring clips. Thereafter a slight push on the cover results in the camming of the portions 28 of the spring clips radially outwardly until the flange 25 is snapped past the high point behind the edge portion 28 of the clip and is thus firmly held against the wheel spider 13 by the tension of the spring clips. It will be appreciated that the diameter of the flange 25 is such that the flexible edge portions 28 of the spring clips cannot return fully to their normal positions when the flange 25 of the wheel cover is in retaining cooperation therewith, and as a consequence the flexible portions 28 are exerting a tensioned pressure on the flange 25.

To remove the cover from the wheel, it is only necessary to insert the edge of a suitable pry-off tool under the turned reinforced edge 19 of the cover member and to pry the cover bodily free from its retaining cooperation with the spring clips 26. This operation does not necessitate removal of the spring clips from the wheel, nor does it require that the wheel cover be made of spring material. Then, too, the utilization of the lockseam between the two parts of the cover as a flange for cooperation with the spring clips provides the cover with a reinforced section at its point of engagement with the spring clips.

Also, it should be noted that the construction of the two parts of the wheel cover is such that both of these parts may be blanked from the same sheet or disk of metal, the part 17 being made from an outer portion of the disk and the part 16 being made from an inner portion of the disk or piece of sheet metal. In so blanking these parts from a common disk of metallic sheet, it should be noted that the part 17 is reversed in position from that in which it is shown in Figure 2, so that after the parts are blanked the ring part 17 is turned to dispose its convex side on the same side as the convex side of the part 16.

I claim as my invention:

1. In a wheel structure including a drop center rim carrying a tire and a body part having a wheel bolt-on flange, a circular wheel cover member comprising a ring of curved cross section for disposition over an outer side of the rim and a central hub cap for disposition over the wheel body part to conceal the bolt-on flange thereof, the inner edge of the ring being lockseamed to the outer edge of the hub cap to form an inclined flange extending generally radially outwardly and axially inwardly toward the wheel rim, and spring means cooperating with said wheel and said flange to retain detachably said cover member on the wheel.

2. In a wheel structure including a drop center rim carrying a tire and a body part having a wheel bolt-on flange, a circular wheel cover member comprising a ring of curved cross section for disposition over an outer side of the rim and a central hub cap for disposition over the wheel body part to conceal the bolt-on flange thereof, the inner edge of the ring being lockseamed to the outer edge of the hub cap to form an inclined flange extending generally radially outwardly and axially inwardly toward the wheel rim, and spring means cooperating with said wheel and said flange to retain detachably said cover member on the wheel, said ring being of curved convex cross section and extending radially outwardly over an outer edge of the rim up to the side wall of said tire so as to have the appearance of being a white side wall portion of the tire.

3. In a wheel structure including a drop center rim carrying a tire and a body part having a wheel bolt-on flange, a circular wheel cover member comprising a ring of curved cross section for disposition over an outer side of the rim and a central hub cap for disposition over the wheel body part to conceal the bolt-on flange thereof, the inner edge of the ring being lockseamed to the outer edge of the hub cap to form an inclined flange extending generally radially outwardly and axially inwardly toward the wheel rim, and spring means cooperating with said wheel and said flange to retain detachably said cover member on the wheel, said seam comprising an outer edge of the hub cap turned outwardly over an inwardly turned edge of the ring and rolled onto and over the rear surface of said turned inner edge.

4. In a wheel structure including a drop center rim carrying a tire and a body part having a wheel bolt-on flange, a circular wheel cover member comprising a ring of curved cross section for disposition over an outer side of the rim and a central hub cap for disposition over the wheel body part to conceal the bolt-on flange thereof, the inner edge of the ring being lockseamed to the outer edge of the hub cap to form an inclined flange extending generally radially outwardly and axially inwardly toward the wheel rim, and spring means cooperating with said wheel and said flange to retain detachably said cover member on the wheel, the outer edge portion of the hub cap being offset rearwardly so as to form an annular shoulder facing the wheel rim and on which the inner marginal edge portion of the ring is interlocked so as to hold said ring centered, said outer edge of the hub cap being turned over the inner edge of the ring to lock said inner marginal portion of the ring tightly against said shoulder.

5. In a wheel structure including a drop center rim carrying a tire and a body part having a wheel bolt-on flange, a circular wheel cover member comprising a ring of curved cross section for disposition over an outer side of the rim and a central hub cap for disposition over the wheel body part to conceal the bolt-on flange thereof, the inner edge of the ring being lockseamed to the outer edge of the hub cap to form an inclined flange extending generally radially outwardly and axially inwardly toward the wheel rim, and spring means cooperating with said wheel and said flange to retain detachably said cover member on the wheel, said spring means comprising a plurality of spring clips inserted in openings in the wheel body, each clip having a flexible outer extremity retainingly cooperating with said inclined flange of the cover member and an inner extremity wedged in one of said openings into tight retained cooperation with the wheel, an intermediate portion of said clip having a shoulder to bear against the body part of the wheel to limit the extent to which the inner end of the spring clip can be inserted in the cooperating wheel opening.

6. In a wheel structure including a drop center rim carrying a tire and a body part having a wheel bolt-on flange, a circular wheel cover member comprising a ring of curved cross section for disposition over an outer side of the rim and a central hub cap for disposition over the wheel body part to conceal the bolt-on flange thereof, the inner edge of the ring being lockseamed to the outer edge of the hub cap to form a flange inclined with respect to the wheel axis and extending rearwardly from the cover member, and spring means cooperating with said wheel and said flange to retain detachably said cover member on the wheel.

GEORGE ALBERT LYON.